United States Patent
Steph et al.

(10) Patent No.: US 8,078,375 B2
(45) Date of Patent: Dec. 13, 2011

(54) GRAVITY BASED BRAKE STROKE SENSOR METHODS AND SYSTEMS

(75) Inventors: James C. Steph, Kilgore, TX (US); Mark J. Kranz, Hallsville, TX (US)

(73) Assignee: Stemco LP

( * ) Notice: Subject to any disclaimer, the term of this patent is extended or adjusted under 35 U.S.C. 154(b) by 0 days.

(21) Appl. No.: 12/168,795

(22) Filed: Jul. 7, 2008

(65) Prior Publication Data

US 2008/0269983 A1  Oct. 30, 2008

Related U.S. Application Data

(62) Division of application No. 11/201,009, filed on Aug. 10, 2005, now Pat. No. 7,398,141.

(60) Provisional application No. 60/600,605, filed on Aug. 11, 2004.

(51) Int. Cl.
G06F 7/70 (2006.01)
B60B 39/00 (2006.01)
G01M 17/00 (2006.01)
F16D 66/00 (2006.01)
B60Q 1/00 (2006.01)

(52) U.S. Cl. .......... 701/70; 701/71; 701/29; 188/1.11 E; 340/453

(58) Field of Classification Search .............. 701/29, 701/70–71; 340/453; 188/1.11 E
See application file for complete search history.

(56) References Cited

U.S. PATENT DOCUMENTS

| 3,438,351 A | 4/1969 | Kirkwood |
| 4,279,214 A | 7/1981 | Thorn |
| 4,776,438 A | 10/1988 | Schandelmeier |
| 4,854,648 A | 8/1989 | Nakao |
| 4,872,731 A | 10/1989 | Nakamura |
| 4,879,964 A | 11/1989 | Emerson, Jr. |
| 4,945,818 A | 8/1990 | Ware |

(Continued)

FOREIGN PATENT DOCUMENTS

JP  411014367 A  *  1/1990

OTHER PUBLICATIONS

Per G. Reinhall and Robert S. Scheibe. Development on an Intelligent Air Brake Warning System for Commercial Vehicles. Idea Program. Transportation Research Board. National Research Council. May 31, 1996. Downloaded at http://www.itsdocs.fhaw.dot.gov/JPODOCS/REPTS_TE/4105.pdf of Feb. 28, 2008.

(Continued)

*Primary Examiner* — James Trammell
*Assistant Examiner* — Muhammad Shafi
(74) *Attorney, Agent, or Firm* — Holland & Hart LLP

(57) ABSTRACT

Methods and systems for measuring a brake stroke of an air brake assembly utilize a sensor, such as an accelerometer, mountable on a movable component, such as a brake cam shaft, of the air brake assembly that is external of the brake chamber of the air brake assembly for detecting an acceleration of the movable component during a braking event. The sensor generates an output signal that depends on a magnitude of the detected acceleration, which is sent to a microcontroller coupled to the sensor. The microcontroller translates the sensor output signal to a value corresponding to a displacement of the movable component of the brake assembly during the braking event and calculates a brake stroke distance based on said value.

7 Claims, 7 Drawing Sheets

U.S. PATENT DOCUMENTS

| | | | |
|---|---|---|---|
| 4,989,222 A | 1/1991 | Lutts et al. | |
| 4,991,310 A | 2/1991 | Melia | |
| 5,244,061 A | 9/1993 | Hoyt et al. | |
| 5,320,198 A | 6/1994 | Hoyt et al. | |
| 5,339,069 A | 8/1994 | Penner et al. | |
| 5,423,401 A | 6/1995 | Noah et al. | |
| 5,441,128 A | 8/1995 | Hoyt | |
| 5,450,930 A | 9/1995 | Martens et al. | |
| 5,699,880 A | 12/1997 | Hockley | |
| 5,892,437 A * | 4/1999 | Scheibe et al. | 340/467 |
| 5,913,385 A | 6/1999 | Thibodeau | |
| 6,012,780 A | 1/2000 | Duvernay | |
| 6,019,197 A | 2/2000 | Judson | |
| 6,135,242 A | 10/2000 | Hockley | |
| 6,183,052 B1 | 2/2001 | Harada et al. | |
| 6,411,206 B1 | 6/2002 | Weant et al. | |
| 6,445,993 B1 | 9/2002 | Eccleston et al. | |
| 6,581,728 B2 | 6/2003 | Borugian | |
| 6,615,125 B2 | 9/2003 | Eccleston et al. | |
| 6,659,233 B2 | 12/2003 | DeVlieg | |
| 6,702,074 B2 | 3/2004 | Roberts | |
| 6,776,266 B2 | 8/2004 | Fuglewicz et al. | |
| 6,891,468 B2 | 5/2005 | Koenigsberg et al. | |
| 6,904,698 B2 | 6/2005 | Halliar et al. | |
| 6,940,940 B2 | 9/2005 | Kranz | |
| 7,104,365 B1 | 9/2006 | Murphy | |
| 7,114,596 B2 | 10/2006 | Borugian | |
| 2001/0037691 A1 * | 11/2001 | Higashijima | 73/862.08 |
| 2002/0063469 A1 | 5/2002 | Nishio | |
| 2002/0088518 A1 * | 7/2002 | Dufournier et al. | 152/154.2 |
| 2003/0132837 A1 * | 7/2003 | Hasegawa et al. | 340/440 |
| 2003/0197603 A1 * | 10/2003 | Stewart et al. | 340/442 |
| 2003/0222774 A1 * | 12/2003 | Koenigsberg et al. | 340/453 |
| 2004/0083811 A1 * | 5/2004 | Kranz | 73/490 |
| 2004/0112684 A1 * | 6/2004 | Fuglewicz et al. | 188/1.11 E |
| 2004/0122569 A1 * | 6/2004 | Bidaud | 701/19 |
| 2005/0011689 A1 * | 1/2005 | Tajima et al. | 180/65.2 |
| 2006/0231305 A1 * | 10/2006 | Severinsky et al. | 180/65.2 |

OTHER PUBLICATIONS

Michael Lang. On-Board Sensors for Determining Brake System Performance. Publication No. FMCSA-PSV-05-001. Jul. 2005. Downloaded at http://fmsca.dot.gov/facts-research/research-technology/tech/brake-system-performance.pdf on Feb. 28, 2008.

Federal Motor Carrier Safety Administration On-Board Brake Stroke Monitoring Systems. Downloaded at http://www.fmcsa.dot.gov/facts-research/systems-technology/productguides/brake-stroke.htm on Feb. 28, 2008.

MGM Brakes e Stroke Product information page. Downloaded at http://mgmbrakes.com/products/e.stroke.cfm on Feb. 27, 2008.

Truck Trailer and Transit. Electronic Brake Inspection. Downloaded at http://www.tttonline.com/product/brakeinsight/Electronic%20Brake%20Inspection%20Systems.htm on Feb. 27, 2008.

Truck Trailer and Transit. Line Card. Downloaded at http://www.tttonline.com/literature/linecard.pdf on Feb. 27, 2008.

* cited by examiner

GRAVITY BASED BRAKE STROKE SENSOR METHODS AND SYSTEMS

PRIORITY APPLICATION

This application is a divisional application of U.S. patent application Ser. No. 11/201,009 entitled "GRAVITY BASED BRAKE STROKE SENSOR METHODS AND SYSTEMS", filed Aug. 10, 2005, which claims priority to U.S Provisional Application No. 60/600,605, filed Aug. 11, 2004, entitled "GRAVITY BASED BRAKE STROKE SENSOR", both of which are incorporated herein by this reference.

FIELD OF THE INVENTION

The present invention relates generally to the field of air brake systems, and more particularly to systems and methods for measuring the brake stroke for heavy-duty trucks and other equipment that use air brake systems utilizing, for example, an accelerometer and a microcontroller or programmable logic device for the brake stroke measurement

BACKGROUND OF THE INVENTION

Most air brake systems utilize a sealed housing or brake chamber, an example of which is illustrated schematically in FIG. 1. Within the brake chamber 10 is a diaphragm 12 attached to a push rod 14 that extends through one side 16 of the brake chamber 10. The opposite side of the diaphragm 12 creates an air cavity 18 within the brake chamber 10. The air pressure in the cavity 18 rises when the brake pedal of the vehicle is depressed. The diaphragm 12 deforms, and the air pressure rises, in proportion to the amount of force applied to the brake pedal. The push rod 14 responds to such deformation by moving with the diaphragm 12 to cause engagement of the braking surfaces. When the air brake system is properly adjusted, the push rod 14 travels a distance of up to about two inches from a point at which the brake is completely released to a point at which it is fully actuated. Over time, as the brakes are repeatedly applied, the travel distance of the push rod 14 increases, eventually requiring a readjustment of the brake system before the braking capability deteriorates to a level that renders the vehicle unsafe.

Typical electronic brake stroke sensors currently use magnetic or resistive means to measure the amount of push rod displacement during a braking event. These sensors and electronics are integrated into the brake chamber causing the user to have to purchase and install an entire brake chamber assembly equipped with the stroke sensing equipment. The prior art is generally divided into two categories, namely mechanical visual indicators and electronics integral to the brake chamber assembly. The mechanical visual indicators are not capable of providing the brake stroke information remotely. A person must also be present to observe the brake stroke while another person operates the brake system. Unfavorable weather conditions may discourage visual inspection, which requires crawling under the truck for inspection of each brake stroke indicator. The brake chambers with integrated electronics are expensive and therefore not good candidates for retrofit applications. Additionally, the installation is a much more complex process than would be acceptable for a retrofit into existing equipment.

Accordingly, there is a present need for an electronic brake stroke sensor capable of integration into an existing brake system without the need for extensive redesign of the brake chamber. Moreover, there is a present need for an electronic brake stroke sensor that requires no moving parts and can be installed without regard to alignment and provides for self-calibration, thus avoiding the problem of misalignment or inaccurate readings.

SUMMARY OF THE INVENTION

It is a feature and advantage of the present invention to provide methods and systems for measuring a brake stroke of an air brake assembly utilizing, for example, a sensor that has no moving parts to break or wear out.

It is a further feature and advantage of the present invention to provide methods and systems for measuring a brake stroke of an air brake assembly utilizing components that can be installed without alignment tools or brackets in that the sensor automatically generates a zero or reference regardless of the installed position on the brake cam shaft.

It is an additional feature and advantage of the present invention to provide methods and systems for measuring a brake stroke of an air brake assembly using a sensor that is sealed and impervious to contaminants It is another feature and advantage of the present invention to provide methods and systems for measuring a brake stroke of an air brake assembly employing electronic components that output data that can be digitized and transmitted elsewhere for data collection purposes.

To achieve the stated and other features, advantages and objects, embodiments of the present invention embodiments of the invention propose methods and systems for measuring the brake stroke of an air brake assembly utilizing, for example, a sensor, such as an accelerometer, that is mountable on a movable component, such as a brake cam shaft, of the air brake assembly external of the brake chamber of the air brake assembly for detecting an acceleration of the movable component during a braking event and for generating an output signal that depends on a magnitude of the detected acceleration. In addition, coupled to the sensor is a microcontroller on which is encoded program code consisting at least in part of instructions for translating the sensor output signal to a value corresponding to a displacement of the movable component of the brake assembly during the braking event and for calculating a brake stroke distance based on that value.

Preferably, in embodiments of the invention, the sensor is adapted for detecting acceleration of the movable component along at least two different axe; relative to the movable component during the braking event. For such purpose, a dual axis accelerometer or at least two unidirectional accelerometers can be employed. In an embodiment of the invention, the sensor output signal comprises a direct current voltage that varies in proportion to the magnitude of the detected acceleration, which is translated by the microcontroller to angular values representing a rotary displacement of the brake cam shaft during the braking event. In a preferred embodiment, the movable component of the air brake assembly comprises a brake cam shaft of the air brake assembly, but in other embodiments, the movable component comprises, for example, a push rod of the air brake assembly or a cam roller of the air brake assembly.

In an aspect of the invention, the microcontroller can be coupled wirelessly to the sensor, and a display device can also be coupled to the microcontroller for presenting brake stroke distance-related information to a user, for example, at a remote terminal coupled to the microcontroller. Further, the display device can be coupled wirelessly to the microcontroller and can include, for example, a portable hand-held display device coupled wirelessly to the microcontroller.

Additional objects, advantages and novel features of the invention will be set forth in part in the description which follows, and in part will become more apparent to those skilled in the art upon examination of the following, or may be learned from practice of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Figure 1:
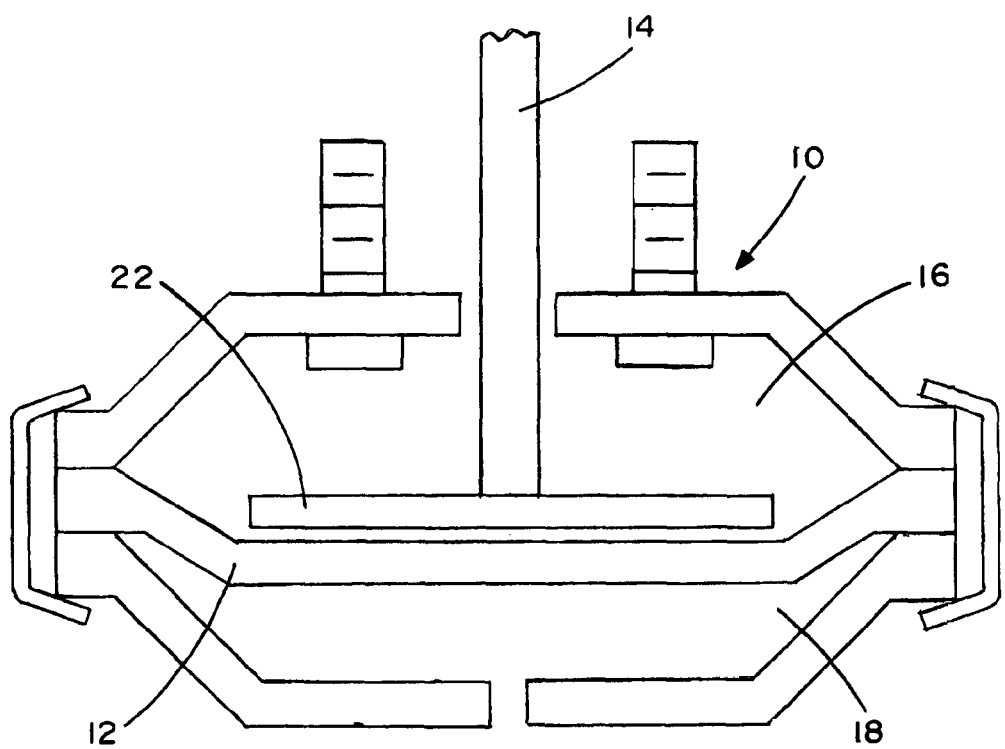
FIG. 1 is a schematic diagram that illustrates an example of a brake chamber for an air brake system for embodiments of the invention.
Figure 2:
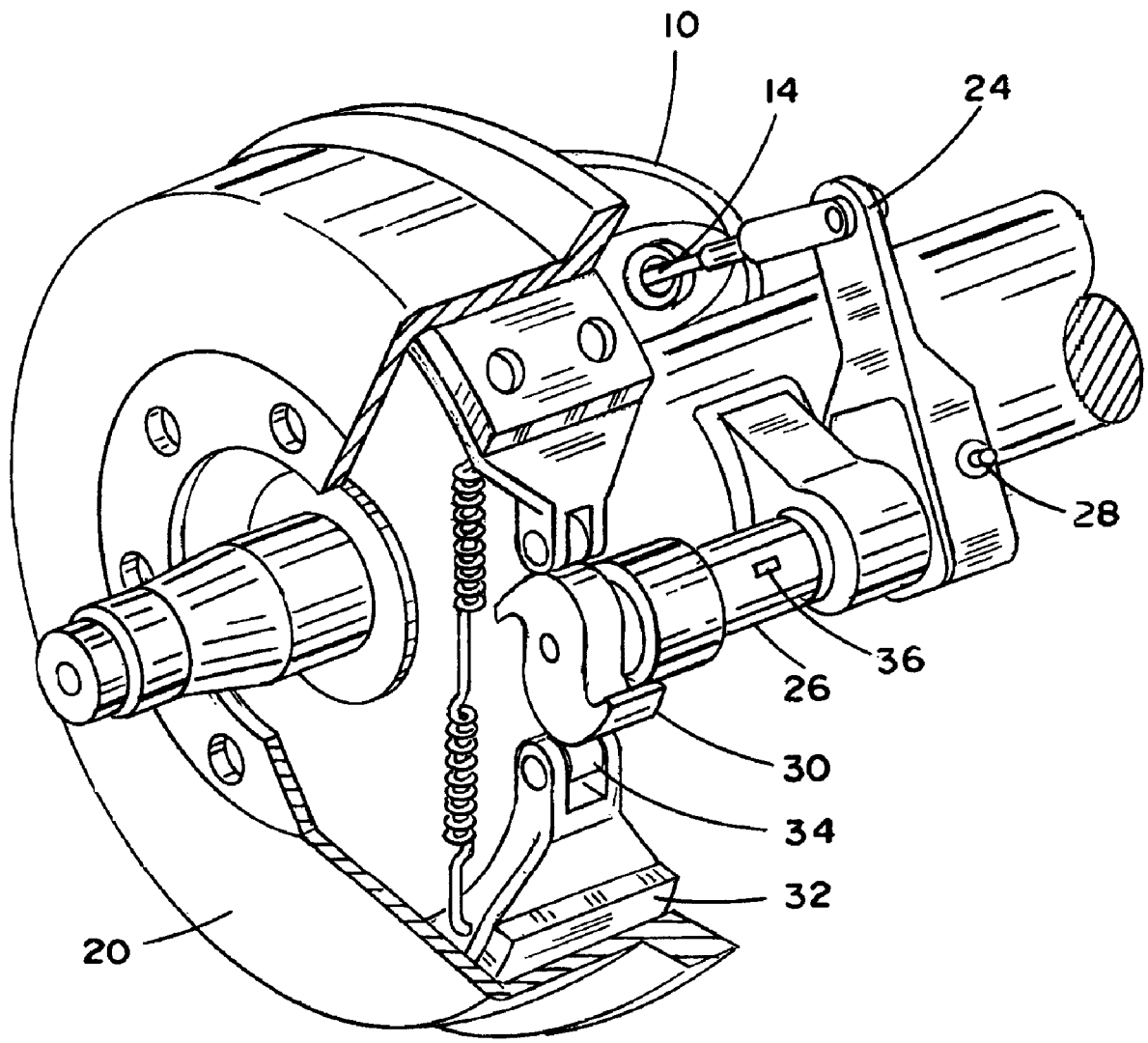
FIG. 2 is a cut-away view of a brake drum and associated components for an air brake system for an embodiment of the invention.

Referring to FIG. 1, as previously noted, the brake chamber 10 of the air brake system converts air pressure to mechanical pressure when air pressure enters the cavity 18 and pushes on the diaphragm 12, which in turn pushes on plate 22 and push rod 14. FIG. 2 is a cut-away view of a brake drum 20 and associated components for an air brake system for an embodiment of the invention. Referring to FIG. 2, the push rod 14 connects to a lever referred to as a slack adjuster 24. The slack adjuster 24 is in turn connected to a rotating shaft 26. An adjusting screw or nut 28 in the slack adjuster 24 is used to set its position on the on the shaft 26 to adjust the brakes. When the brakes are applied, the push rod 14 pushes on the slack adjuster 24 causing it to rotate the shaft 26 and a cam or S-cam 30 between two brake shoes 32. The rotating S-cam 30 pushes on rollers or pads 34 connected to the brake shoes 32, which causes the brake shoes 32 to rub against the brake drum 20 to stop the vehicle. While an air brake using an S-cam is illustrated in the example depicted in FIG. 2, embodiments of the present invention can be utilized in other types of air brakes, such as wedge brakes and/or disc brakes.

In an aspect of the present invention, a system and method is provided for measuring the brake stroke, i.e., the push rod travel distance, for heavy-duty trucks and other equipment that use air brake systems. In an embodiment of the invention, the brake stroke measurement is made using an accelerometer and a microcontroller or programmable logic device. Preferably, the accelerometer and electronic components of the system for embodiments of the invention comprise a solid state system with no moving parts. Use of a solid state system with no moving parts allows freedom in design of the surrounding enclosures, leading to a potential for cost reductions in the unit since one unit can work with variable brake sizes and geometries.

An accelerometer outputs, for example, current or voltage that is proportional to acceleration, which integrated over time equals speed of an object, which in turn integrated over time results in distance. Accelerometers are available in many varieties including, for example, piezoelectric accelerometers, potentiometric accelerometers, and reductive accelerometers. Piezoelectric accelerometers use piezoelectric crystals to produce an electric charge when a force is exerted under acceleration. Potentiometric accelerometers utilize displacement of a spring and mass linked to a wiper arm which moves across a potentiometer. Reductive accelerometers employ an inductance bridge to produce an output voltage proportional to the movement of a mass by causing the inductances of two coils to vary in opposing directions.

Other types of accelerometers include, for example, strain gauge accelerometers, capacitive accelerometers, and vibrating element accelerometers. Strain gauge accelerometers are piezoresistive accelerometers which use strain gauges acting as arms of a Wheatstone bridge to convert mechanical strain to DC voltage. In capacitive accelerometers, a change in acceleration causes a change in the space between a moving and a fixed electrode. In vibrating element accelerometers, a small displacement of the mass varies the tension of a tungsten wire in a permanent magnetic field and current through the wire causes the wire to vibrate at a resonant frequency.

All accelerometers share the characteristic of measuring an acceleration in a given direction. Positive accelerometer readings are indicative of an acceleration in the direction of orientation of the accelerometer. Negative accelerometer readings are indicative of an acceleration directly opposite or offset 180 degrees from the direction of orientation of the accelerometer. In a preferred embodiment of the present invention, the accelerometer comprises a device capable of measuring an acceleration applied thereto.

A preferred embodiment of the present invention employs an accelerometer sensor that comprises a surface micromachined polysilicon structure built on top of the silicon wafer. Polysilicon springs suspend the structure over the surface of the wafer and provide a resistance against acceleration. Deflection of the structure is measured using a differential capacitor that consists of independent fixed plates and central plates attached to the moving mass. The fixed plates are driven by 180 degree-out-of-phase square waves. An acceleration deflects the beam and unbalances the differential capacitor, resulting in an output square wave whose amplitude is proportional to acceleration. Phase sensitive demodulation techniques are then used to rectify the signal and determine the direction of the acceleration.

In a preferred embodiment of the invention, the accelerometer comprises a dual-axis accelerometer. Dual axis accelerometers have two sensors and measure acceleration along two axes. An alternate embodiment employs two unidirectional accelerometers, and acceleration is detected along two axes by mounting the two unidirectional accelerometers along differing axes. Addition of the second axis of measurement is preferable, as this greatly simplifies the digital filtering required to reduce noise and vibrations. The output of the accelerometer x-axis and y-axis sensors is a direct current (DC) voltage that varies with measured acceleration. Thus, rotation of the brake cam shaft 26 is represented by a sine or cosine wave of DC voltage as output from the accelerometer.

Figure 3:
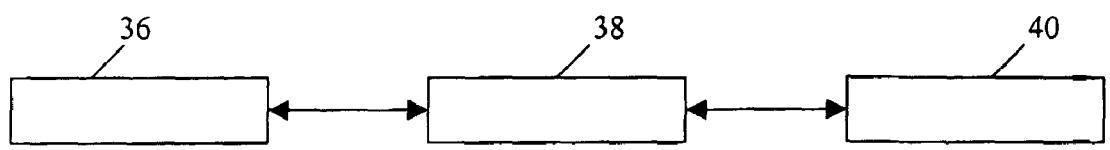
FIG. 3 is a schematic diagram that illustrates an example of key components and flow of information between key components for embodiments of the invention.

In an embodiment of the invention, a dual axis accelerometer based sensor 36 is attached to the brake cam shaft 26 in the location shown by FIG. 2, to measure the shaft rotation during brake actuation external to the brake chamber 10. FIG. 3 is a schematic diagram that illustrates an example of key components and flow of information between electronic components for an embodiment of the invention. Referring to FIGS. 2 and 3, a microcontroller 38 is used to translate the output signals of the dual axis accelerometer 36 into angular values representing the rotation of the brake cam shaft 26. By determining the rotation of the brake cam shaft 26, the microcontroller 38 can calculate the brake stroke based on the length of the slack adjuster 24 and can display the brake stroke on a display device 40 for a user.

In an embodiment of the invention, the dual axis accelerometer 36 is positioned such that both axes are perpendicular to the brake cam shaft axial centerline. Preferably, the two axes are offset from one another by 90 degrees, such that the axis of rotation of the cam shaft 26 and the two axes of the accelerometer 36 are all perpendicular relative to each other. By measuring the acceleration due to the earth's gravity in each axis, a resultant vector can be calculated to determine a relative position for the brake cam shaft 26. By periodic sampling of the brake cam shaft position, a minimum and maximum angular value can be determined for a brake event. The difference between the minimum and maximum angular values is the angular rotation experienced by the brake cam shaft 26. The push rod displacement, i.e., brake stroke, can then be calculated using the length from the axial center of the brake cam shaft 26 to the axial center of the push rod linkage (effectively, the length of the slack adjuster 24).

Figure 4:
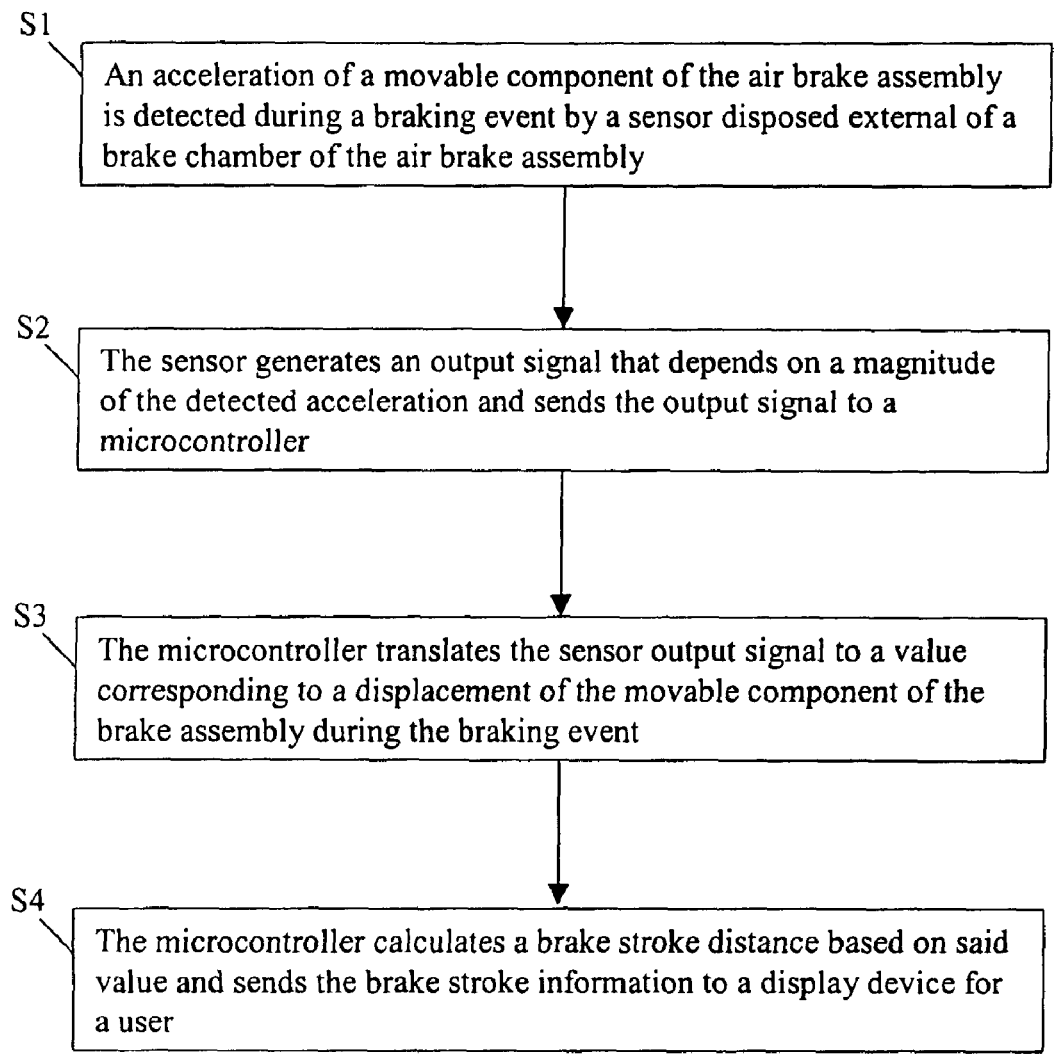
FIG. 4 is a flow chart that illustrates an example of the process of measuring a brake stroke of an air brake assembly for an embodiment of the invention.

FIG. 4 is a flow chart that illustrates an example of the process of measuring a brake stroke of an air brake assembly for an embodiment of the invention. Referring to FIG. 4, at S1, an acceleration of a movable component of the air brake assembly is detected during a braking event by a sensor disposed external of a brake chamber of the air brake assembly. At S2, the sensor generates an output signal that depends on a magnitude of the detected acceleration and sends the output signal to a microcontroller. At S3, the microcontroller translates the sensor output signal to a value corresponding to a displacement of the movable component of the brake assembly during the braking event, and at S4, the microcontroller calculates a brake stroke distance based on said value and sends the brake stroke information to a display device for a user.

Figure 5:
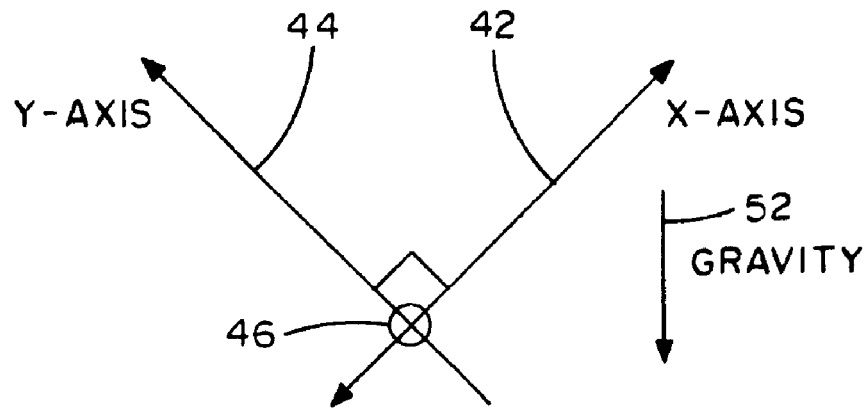
FIG. 5 is a schematic diagram that illustrates an example of orthogonal axes, of a dual axis accelerometer in the gravitational field of the earth for an embodiment of the invention.
Figure 6:
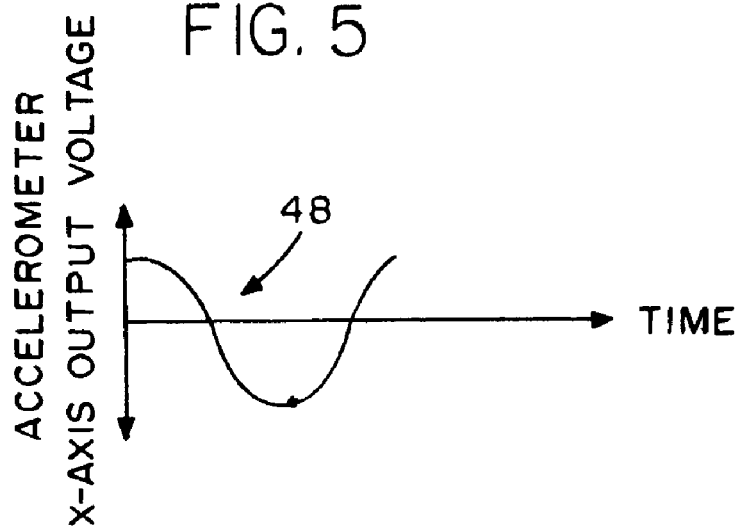
FIG. 6 is an output voltage diagram that shows an example of the x-axis output voltage and corresponding y-axis output voltage in an acceleration event for an embodiment of the invention.
Figure 6:
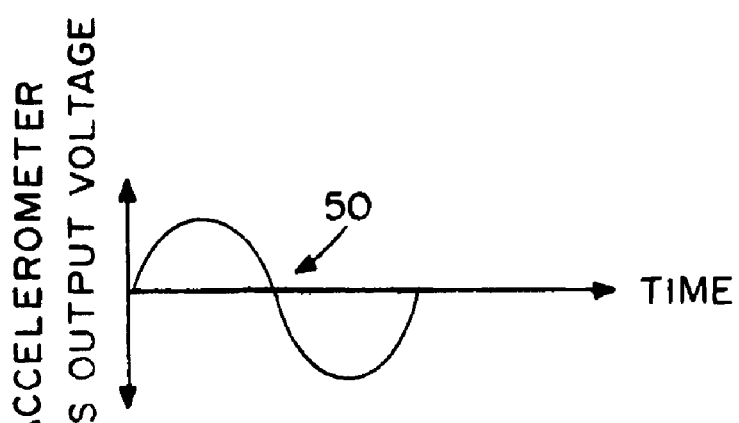

FIG. 5 is a schematic diagram that illustrates an example of orthogonal axes of a dual axis accelerometer in the gravitational field of the earth for an embodiment of the invention, and FIG. 6 is an output voltage diagram that shows an example of the x-axis output voltage and corresponding y-axis output voltage in an acceleration event for an embodiment of the invention. Referring to FIGS. 2, 5 and 6, the x axis 42 and y-axis 44 of the accelerometer 36 are disposed at right angles to one another and both are disposed at right angles to the axis 46 of the brake cam shaft 26. The accelerometer 36 has a set of orthogonal axes, the x-axis 42 and the y-axis 44, that each give a voltage output 48, 50 as illustrated in the example shown in FIG. 6. Placed in the earth's gravitational field 52, the accelerometer 36 outputs an x-axis voltage 48 and a y-axis voltage 50, or a voltage for each axis, which is proportional to the acceleration along the respective axis.

Referring further to FIGS. 2, 5 and 6, utilizing the x-axis voltage output 48 and the y-axis voltage output 50 with the inverse tangent function, $\theta_1 = \tan^{-1} y_1/x_1$, where $y_1$ and $x_1$ are the accelerometer y-axis output voltage 50 and x-axis output voltage 48, to get the angle of rotation, $\theta_1$, for the accelerometer 36. As previously noted, the accelerometer 36 is affixed to the brake cam shaft 26 such that the brake cam shaft axis 46 is orthogonal to both the x-axis 44 and the y-axis 50 of the accelerometer 36.

Figure 7:
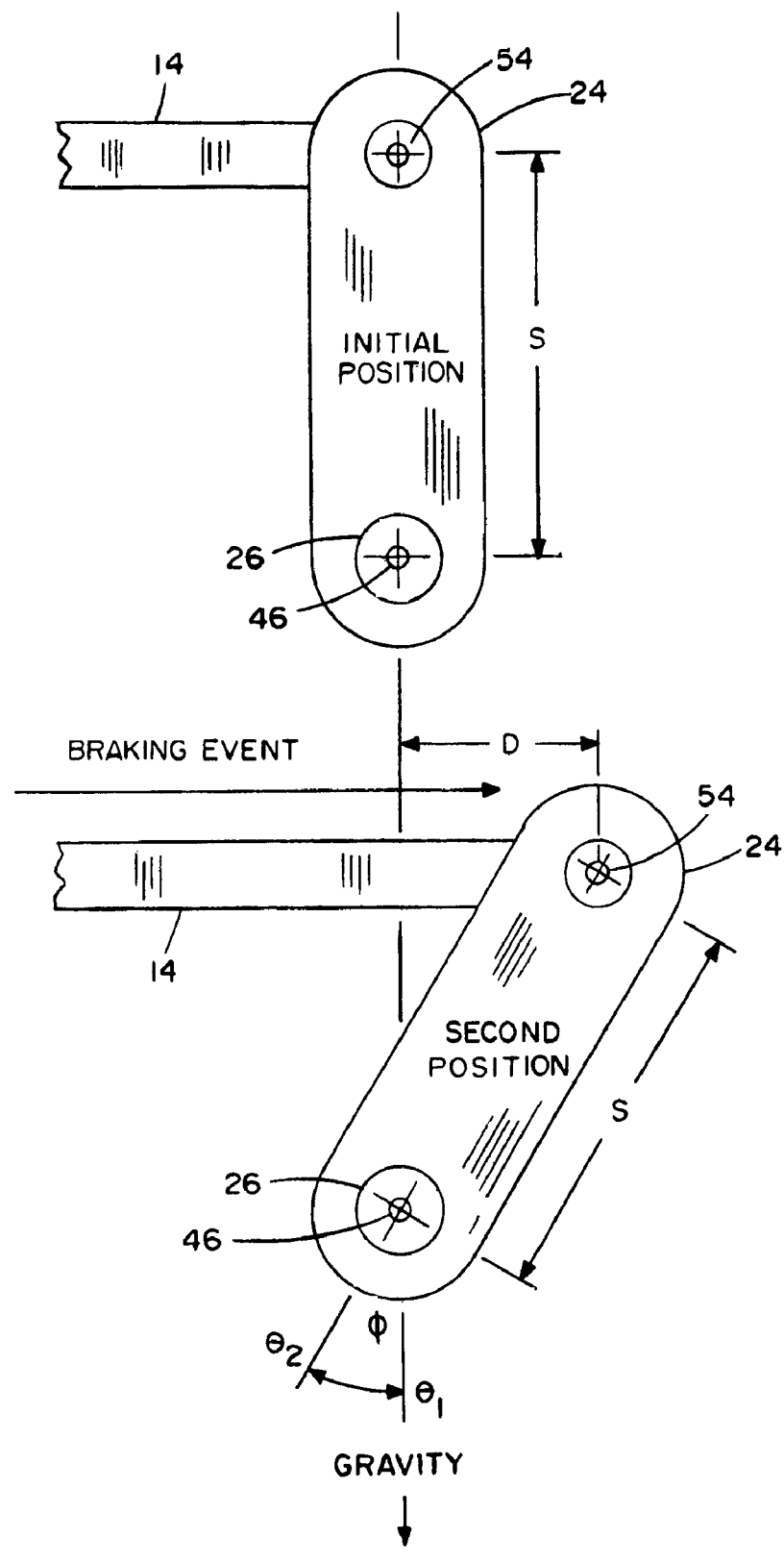
FIG. 7 is a schematic diagram that illustrates an example of initial and final positions of the slack adjuster and push rod in a braking event for an embodiment of the invention.

FIG. 7 is a schematic diagram that illustrates an example of initial and final positions of the slack adjuster 24 and push rod 14 in a braking event for an embodiment of the invention. In the foregoing equation, $\theta_1$ represents an initial angular rotational position of the cam shaft 26. During a braking event, the brake cam shaft 26 rotates through a range of angles and then stops at a second position represented by $\theta_2$ which is the maximum angle attained by the cam shaft 26 relative to $\theta_1$ during the braking event. An embodiment of the invention yields a value for the maximum range of angular motion of rotation of the brake cam shaft.

Referring again to FIG. 7, during a braking event, the push rod 14 extending from the brake chamber 10 pushes the slack adjuster 24 which causes the brake cam shaft 26 coupled to the S-cam 30 to rotate. By measuring the angular rotation of the cam shaft 26 during a braking event, and with knowledge of a distance "S" between the axis 46 of the brake cam shaft 26 and the pivot axis 54 of the push rod 14 coupled to the slack adjuster 24, an embodiment of the invention yields a value "D" for the amount of displacement of the push rod 14.

Referring further to FIG. 7, at the second position of the slack adjuster 24, the angular rotation of the brake cam shaft 26 in the second position, $\theta_2$, is likewise computed utilizing the inverse tangent function. The difference, $\phi$, between the rotational angle, $\theta_2$, in the second position of the brake cam shaft 26 and the rotational angle, $\theta_1$, in the first position of the brake cam shaft 26, represents the total angle of rotation of the brake cam shaft 26 during a braking event.

As already mentioned, an embodiment of the invention utilizes the inverse tangent function to calculate initial and final angular rotations $\theta_1$, $\theta_2$, based on the x-axis and y-axis voltage outputs 48, 50 of the accelerometer 36 for initial and final angular rotation positions of the brake cam shaft 26 during a braking event. The difference $\phi$ between $\theta_2$ and $\theta_1$ is then multiplied by the distance "S" between the axis 46 of the brake cam shaft 26 and the pivot axis 54 of the push rod 14 coupled to the slack adjuster 24 (i.e., the approximate length of the slack adjuster 24) to calculate the displacement "D" of the push rod 14 during the braking event. While the actual calculated value "D" represents the arc length traveled by the pivot axis 54 of the push rod 14 coupled to the slack adjuster 24, the difference between the chord length and the arc length for such a small rotation is less than one-half percent, which is more than adequately accurate for determining the displacement of the push rod 14, as a practical matter.

As also previously noted, the mounting alignment of the accelerometer 36 for embodiments of the invention is not important, because the rotational angles $\theta_1$, $\theta_2$ are measured relative to the acceleration of gravity 52, such that orientation of the accelerometer 36 is not important, except that the x-axis 42 and y-axis 44 are orthogonal to the axis 46 of the brake cam shaft 26. Further it is not necessary to mount the accelerometer 36 along the axis 46 of the brake cam shaft 26, and it can be simply strapped to the outside of the brake cam shaft 26 as long as the x-axis 42, the y-axis 44, and the axis 46 of the brake cam shaft 26 are orthogonal to one another In an embodiment of the invention, the accelerometer 36 is incorporated into a sealed package that mounts directly to the brake cam shaft 26. A cable is employed to transmit the analog accelerometer output signals to the microcontroller 38 for digitization of the values and calculation of the push rod displacement. In an alternate embodiment, the accelerometer 36 can be mounted at locations other than the brake cam shaft 26. For example, the accelerometer 36 can be mounted to the push rod 14 or cam roller 34. Additionally, in other embodiments of the invention, analog equivalents to the microcontroller 38 can be used to produce similar results. A programmable logic device along with an analog to digital converter can also be used to achieve brake stroke length measurement.

In a further embodiment of the invention, the display device 40 is mounted proximate the vehicle wheel, preferably on or near the brake housing and is coupled to the brake stroke sensor. In a preferred embodiment, the display device 40 can comprise, for example, a light emitting diode (LED), liquid crystal display (LCD or other such low-power display. In embodiments of the invention, the microcontroller 38 operates the display device 40 to make brake stroke data visually available to a user. In a preferred embodiment, battery life is extended by toggling the display such that it is only "on" when the vehicle is stationary.

In further embodiments of the present invention, a radio frequency identification (RFID) device, or other wireless communication device, is employed to transmit accelerometer data from the brake region to a remote computer. Typically, such a system includes an interrogator at the remote location that generates a modulated or unmodulated radio frequency interrogation signal, and an RF "tag" incorporated into the brake sensor to receive the signal from the interrogator and communicate accelerometer data back to the interrogator.

The interrogator of the radio frequency (RF) communication system is positioned proximate the brake system within range of the backscatter RF signal. Such locations can include the passenger compartment of the vehicle on which the brake stroke sensor is mounted, a portable hand-held device positioned near the wheel, or associated with a storage or maintenance yard where such vehicles are kept. The interrogator may further be associated with the display device 40 to provide brake stroke sensor data to a user. In a preferred embodiment, the interrogator and display device 40 are located within the passenger compartment of the vehicle to allow the driver to receive real time brake stroke data, and warn of any dangerous conditions.

In a still further embodiment of the present invention, information from the brake stroke sensor is communicated from the wheel mounted location to the interrogator and further to a wireless network such as a cellular or satellite network. In this embodiment, the interrogator is in communication with a network interface that allows the information to be further communicated throughout network. For example, a user at a central monitoring station can monitor brake stroke sensor data for a vehicle or fleet of vehicles simultaneously.

Figure 8:
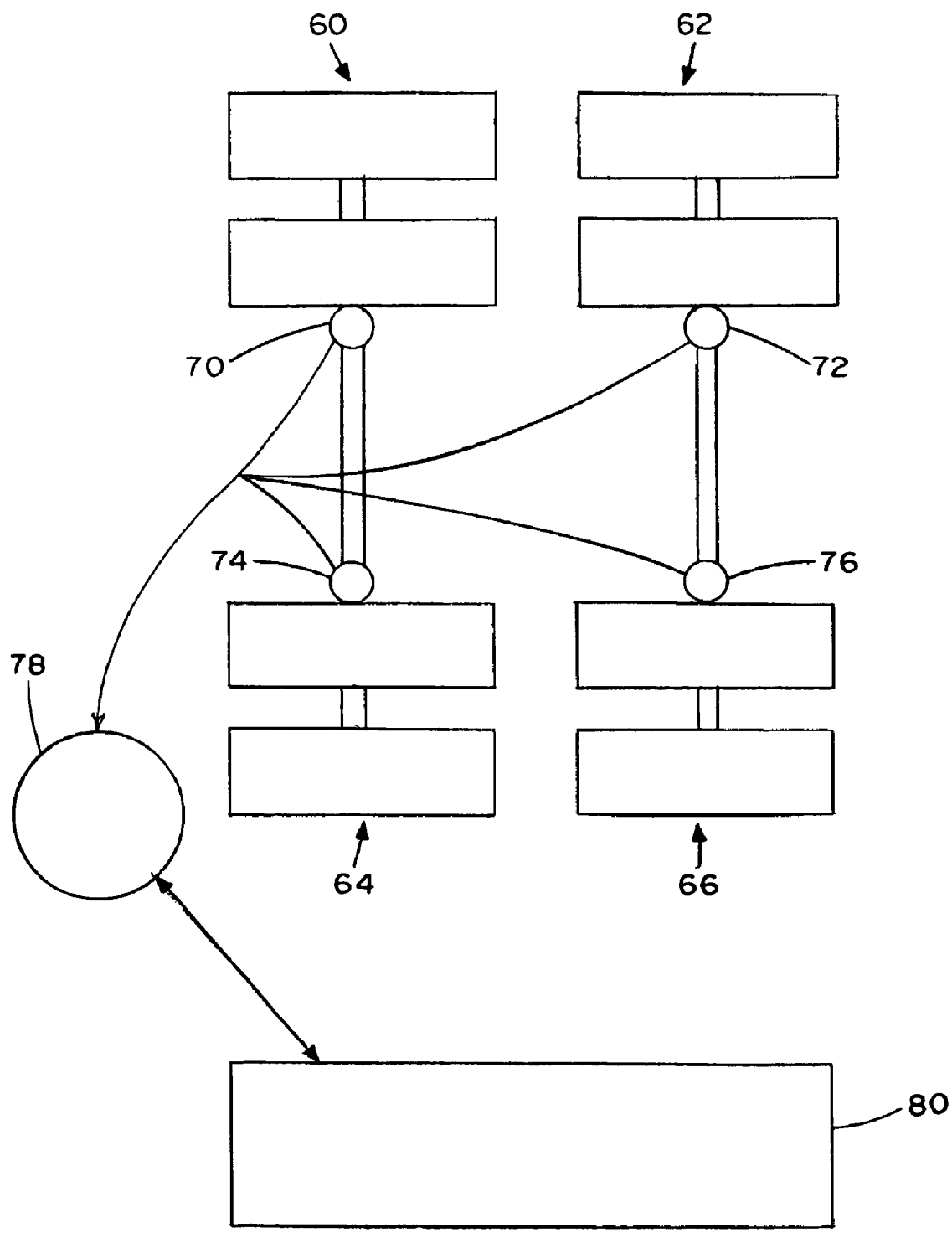
FIG. 8 is a schematic diagram that illustrates an example of deployment of a plurality of brake stroke sensors in a vehicle brake system for an embodiment of the invention.

FIG. 8 is a schematic diagram that illustrates an example of deployment of a plurality of brake stroke sensors in a vehicle brake system for an embodiment of the invention. Referring to FIG. 8, assume a vehicle, such as a tractor or a trailer has, for example, four sets of dual wheels 60, 62, 64, 66 for the drive axles or for the trailer load axles. In an embodiment of the invention, a brake stroke sensor 70, 72, 74, 76 is affixed to each set of dual wheels 60, 62, 64, 66, and a microcontroller and radio frequency (RF) transceiver or transmitter 78 serves as a single collection point for the multiple sensors 70, 72, 74, 76 and reports the brake stroke information either to a remote device 80 or displays the data locally.

Thus, in an embodiment of the invention, an accelerometer 70, 72, 74, 76 is associated with (e.g., mounted on) the brake cam shaft for each set of wheels 60, 62, 64, 66 and each is coupled via a cable or wirelessly to an active or semi-passive RFID tag 78. Thus, the data from the multiple accelerometers 70, 72, 74, 76 comes into a single collection point 78 and is transmitted from there via an RF link or infrared link or some type of communication to a remote reader 80 or display or embedded device or PC.

Another aspect of the invention involves, for example, a gate reader set up such that one of the remote readers is a gate reader. In a further aspect of the invention, the same mobile communications platforms, such as cellular, GLS, or satellite links that are currently in use, for example, on tractor-trailer or bus tracking platforms that periodically wirelessly report information on a truck in terms of location or information about the engine to a central location, can likewise by used to communicate brake stroke information in the same type of system.

The embodiments of the present invention, described herein provide man) features and advantages over the prior art systems and methods for measuring brake stroke. These features and advantages include, for example: a sensor that has no moving parts to break or wear out, installation of the device without alignment tools or brackets, the sensor automatically generates a zero or reference regardless of the installed position on the brake cam shaft, the sensor is sealed and impervious to contaminants, and the system is electronic and therefore may be digitized and transmitted elsewhere for data collection purposes.

Although the present invention has been described with reference to particular embodiments, it should be recognized that these embodiments are merely illustrative of the principles of the present invention. Those of ordinary skill in the art will appreciate that the apparatus and methods of the present invention may be constricted and implemented in other ways and embodiments. Accordingly, the description herein should not be read as limiting the present invention, as other embodiments also fall within the scope of the present invention.

What is claimed is:

1. A method of measuring a brake stroke of an air brake assembly, comprising:
    detecting an acceleration of a rotating shaft of the air brake assembly during a braking event by a sensor mounted on the rotating shaft external of a brake chamber of the air brake assembly, the sensor rotating with the rotating shaft;
    generating an output signal by the sensor that depends on a magnitude of the detected acceleration;
    translating the sensor output signal to a value corresponding to a displacement of the rotating shaft of the brake assembly during the braking event by a microcontroller coupled to the sensor; and
    calculating a brake stroke distance based on said value from the microcontroller.

2. The method of claim 1, wherein detecting the acceleration by the sensor further detecting the acceleration by an accelerometer.

3. The method of claim 1, wherein detecting the acceleration further comprises detecting the acceleration of the rotating shaft along at least two different axes relative to the rotating shaft during the braking event.

4. The method of claim 1, wherein detecting the acceleration further comprises detecting the acceleration of the rotating shaft along at least two different axes relative to the rotating shaft during the braking event by a dual axis accelerometer.

5. The method of claim 1, wherein detecting the acceleration further comprises detecting the acceleration of the rotating shaft along at least two different axes relative to the rotating shaft during the braking event by at least two unidirectional accelerometers.

6. The method of claim 1, wherein generating the output signal further comprises generating a direct current voltage output signal by the sensor that varies in proportion to the magnitude of the detected acceleration.

7. The method of claim 1, wherein translating the sensor output signal to the value corresponding to a displacement of the rotating shaft further comprises translating the sensor output signal to angular values representing a rotary displacement of the rotating shaft during the braking event.

* * * * *